(12) United States Patent
Sabandith

(10) Patent No.: US 10,574,840 B1
(45) Date of Patent: Feb. 25, 2020

(54) SYSTEM AND METHOD FOR MACHINE LEARNING CLASSIFICATION ON SENSITIVE DATA FOR TELEMETRY

(71) Applicant: Toshiba TEC Kabushiki Kaisha, Shinagawa-ku (JP)

(72) Inventor: Milong Sabandith, Irvine, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/173,592

(22) Filed: Oct. 29, 2018

(51) Int. Cl.
*H04N 1/00* (2006.01)
*G06K 9/62* (2006.01)
*G06F 3/12* (2006.01)
*G06N 20/00* (2019.01)

(52) U.S. Cl.
CPC ......... *H04N 1/00336* (2013.01); *G06F 3/123* (2013.01); *G06F 3/1203* (2013.01); *G06K 9/6217* (2013.01); *G06N 20/00* (2019.01); *H04N 1/00222* (2013.01); *H04N 2201/0094* (2013.01); *H04N 2201/3225* (2013.01)

(58) Field of Classification Search
CPC ........... H04N 1/00336; H04N 1/00222; H04N 2201/3225; G06N 20/00; G06F 3/1203; G06K 9/6217

USPC ........................................................ 358/1.15
See application file for complete search history.

(56) References Cited

U.S. PATENT DOCUMENTS

| 8,351,059 | B2 | 1/2013 | Mori |
| 8,411,960 | B2 | 4/2013 | Misawa et al. |
| 2007/0011726 | A1* | 1/2007 | Choi ................. H04N 1/32128 726/5 |
| 2010/0253967 | A1 | 10/2010 | Privault et al. |
| 2015/0153976 | A1* | 6/2015 | Srinivasmurthy .... G06F 3/1204 358/1.15 |
| 2015/0193180 | A1 | 7/2015 | Rhodus et al. |

* cited by examiner

*Primary Examiner* — Saeid Ebrahimi Dehkordy
(74) *Attorney, Agent, or Firm* — Ulmer & Berne LLP

(57) ABSTRACT

A system and method for machine learning classification of sensitive data includes a multifunction peripheral having an intelligent controller with a processor and associated memory, and print and scan engines operable in connection with instructions received from the controller. The processor receives electronic document data comprised of a plurality of electronic documents. The processor applies machine learning to the electronic document data and extracts metadata comprised as data patterns which are stored in memory. The processor generates pattern classifications from extracted data patterns to generate telemetry data. Generated telemetry data is sent to an associated server via the network interface. The server provides analytics on received telemetry data to provide enhancements for improving the multifunction peripheral.

20 Claims, 4 Drawing Sheets

SYSTEM AND METHOD FOR MACHINE LEARNING CLASSIFICATION ON SENSITIVE DATA FOR TELEMETRY

TECHNICAL FIELD

This application relates generally to improving device functionality by application of machine learning. The application relates more particularly to extraction of telemetry data from otherwise sensitive electronic documents directly on a multifunction peripheral wherein the telemetry data, scrubbed of sensitive information, is relayed to an analytics server to determine recommendations for advantageous modifications to the multifunction peripheral.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are powerful office machines that have a great degree of functionality. Individual MFPs or groups of MFPs may be monitored remotely via network connection. Certain operations may include processing of documents with sensitive content. It is undesirable to make such sensitive information accessible beyond an MFP itself, such as accessible via remote monitoring device.

BRIEF DESCRIPTION OF THE DRAWINGS

Various embodiments will become better understood with regard to the following description, appended claims and accompanying drawings wherein:

DETAILED DESCRIPTION

Figure 1:
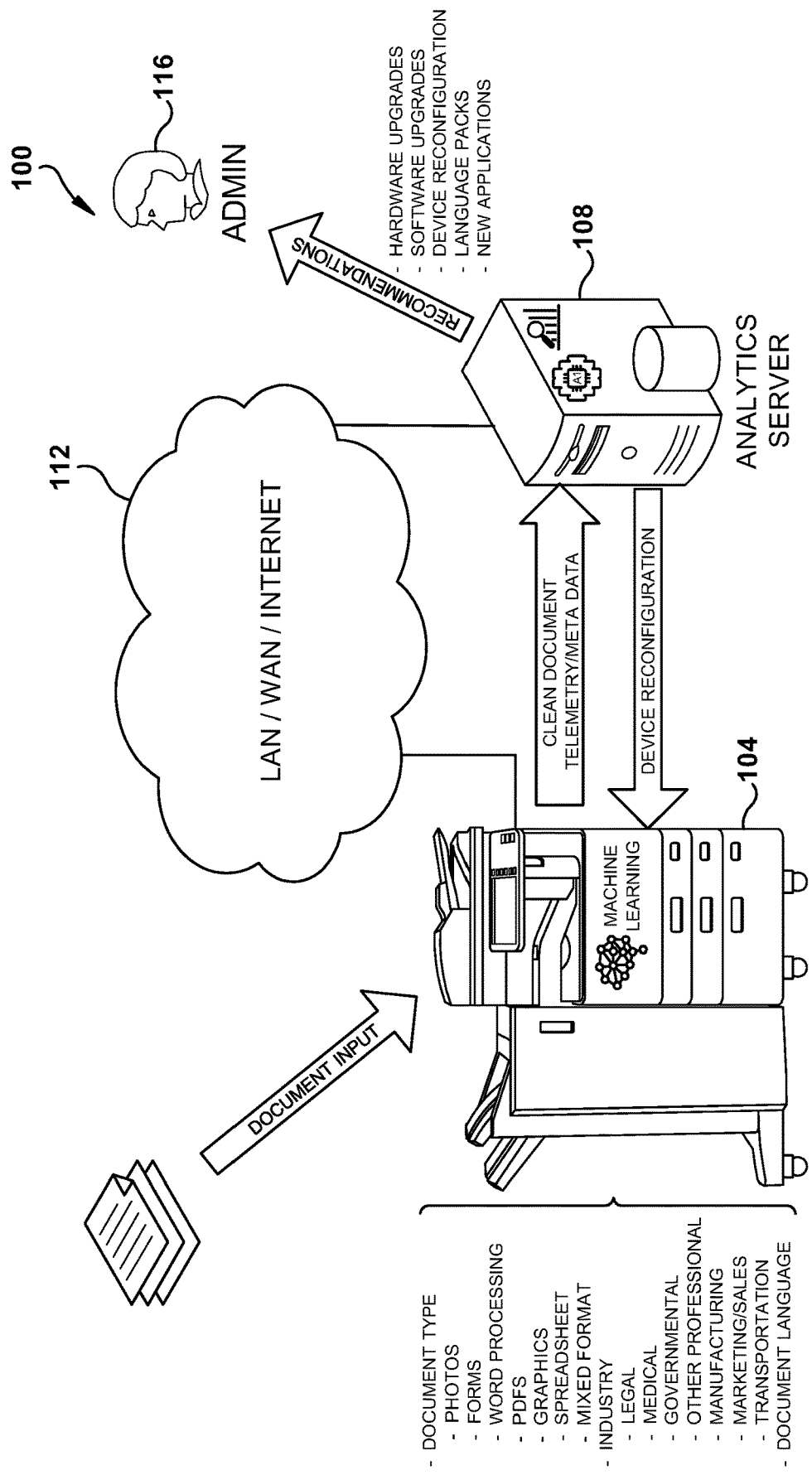
FIG. 1 an example embodiment of machine learning classification on sensitive data for telemetry.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In an example embodiment disclosed herein, a multifunction peripheral has an intelligent controller with a processor and associated memory, and print and scan engines operable in connection with instructions received from the controller. The processor receives electronic document data comprised of a plurality of electronic documents. The processor applies machine learning to the electronic document data and extracts metadata comprised as data patterns which are stored in memory. The processor generates pattern classifications from extracted data patterns to generate telemetry data. Generated telemetry data is sent to an associated server via the network interface.

When MFP operations are monitored, such as by networked administrator, it may be very useful to know how one or more devices are being used and the types of documents are being processed. However, documents may include sensitive information, such as personal information or confidential information. Sensitive documents include medical records, financial records, legal documents, and the like. It may be difficult to determine which documents are sensitive, so it is safer to assume that all documents processed by an MFP are sensitive. Accordingly, useful administrative information relative to confidential documents may be unavailable for access by a device monitoring system. However, confidential documents contain information which if analyzed can help a device, or a device user, be more productive.

In the example embodiments, a system and method function to create metadata on documents using artificial intelligence (AI) classification techniques. The data analyzed does not contain sensitive information and can be shared outside a device or secure network via telemetry. Telemetry is an automated communications process by which measurements and other data are collected at remote or inaccessible points and transmitted to receiving equipment for monitoring. If a device user approves transmission of telemetry data, they will have improved application support, new language packages produced based on their needs, and other business possibilities. Embodiments herein leverage the power of machine learning engines using suitable classification algorithms to remove sensitive customer information but still provide useful telemetry data. Cleansed telemetry data can be shared outside an MFP allowing for improved analytics to help the customer. Machine learning classification is processed by an MFP to create shareable telemetry data. Analytics are applied and verified outside the MFP but, as classification is done locally on the MFP, sensitive documents will not need to leave the device. Telemetry data can be shared and used to help the customer with their business. Machine learning classification algorithms mine telemetry data which can be shared. Such machine learning models are created outside an MFP without burdening MFP resources. With classification done locally on the device, richer data can be made available to help improve customer business.

In example embodiments, processed documents are fed into a machine learning classification engine. Models are tuned to classify useful data such as document type, language, industry, and any other suitable classification type. Resultant telemetry data is then sent to the cloud where it can be analyzed further using suitable machine learning models. Such models aid in determining future printer upgrades, language packs, and potential application development. Classification algorithms produce useful metadata relative to processed documents, such as printed, scanned, emailed, or faxed documents.

In accordance with the subject application, FIG. 1 illustrates an example embodiment of a system 100 for machine learning classification on sensitive data for telemetry. MFP 104 is in networked data communication with analytics server 108 via network cloud 112. Server 108 suitably monitors MFPs, such as MFP 104, via a device management system such as e-BRIDGE Cloud Connect from Toshiba TEC. Cloud 112 is suitably comprised of a local area network (LAN), wide area network (WAN), which may comprise the Internet, or any suitable combination thereof. Data communication is accomplished by any suitable wired or wireless protocol. MFP 104 operatively processes paper and electronic documents in operations such as printing, faxing, scanning or emailing. MFP 104, suitably via its intelligent controller, classifies processed document via machine learning. Classification is suitably done on document content analysis, and includes classifications such as document type, document content, an industry associated with a document or a language associated with a document. Any suitable classification may be implemented. MFP 104 extracts metadata relative to such classification, which metadata is devoid of any sensitive information. Metadata, thus scrubbed from sensitive data, forms telemetry data to be relayed to server 108.

Server 108 receives telemetry data for one or more MFPs, and suitably derives, via machine learning and artificial intelligence, recommendations that can assist in improving an MFP. Such recommendations may be configuration changes that can be relayed to an administrator 116, or directly to a device such as MFP 104. Additional recommendations are suitably generated, such as possible hardware or software modifications or installation of language packs. Recommendations can be expanded or contracted by providing additional feedback to server 108 to augment its machine learning.

Machine learning or artificial intelligence applications can be implemented on any suitable platform such as Microsoft's AZURE. Alternatives, by way of example, include platforms INZATA, ANSWEROCKET, SEEBO, and others.

Figure 2:
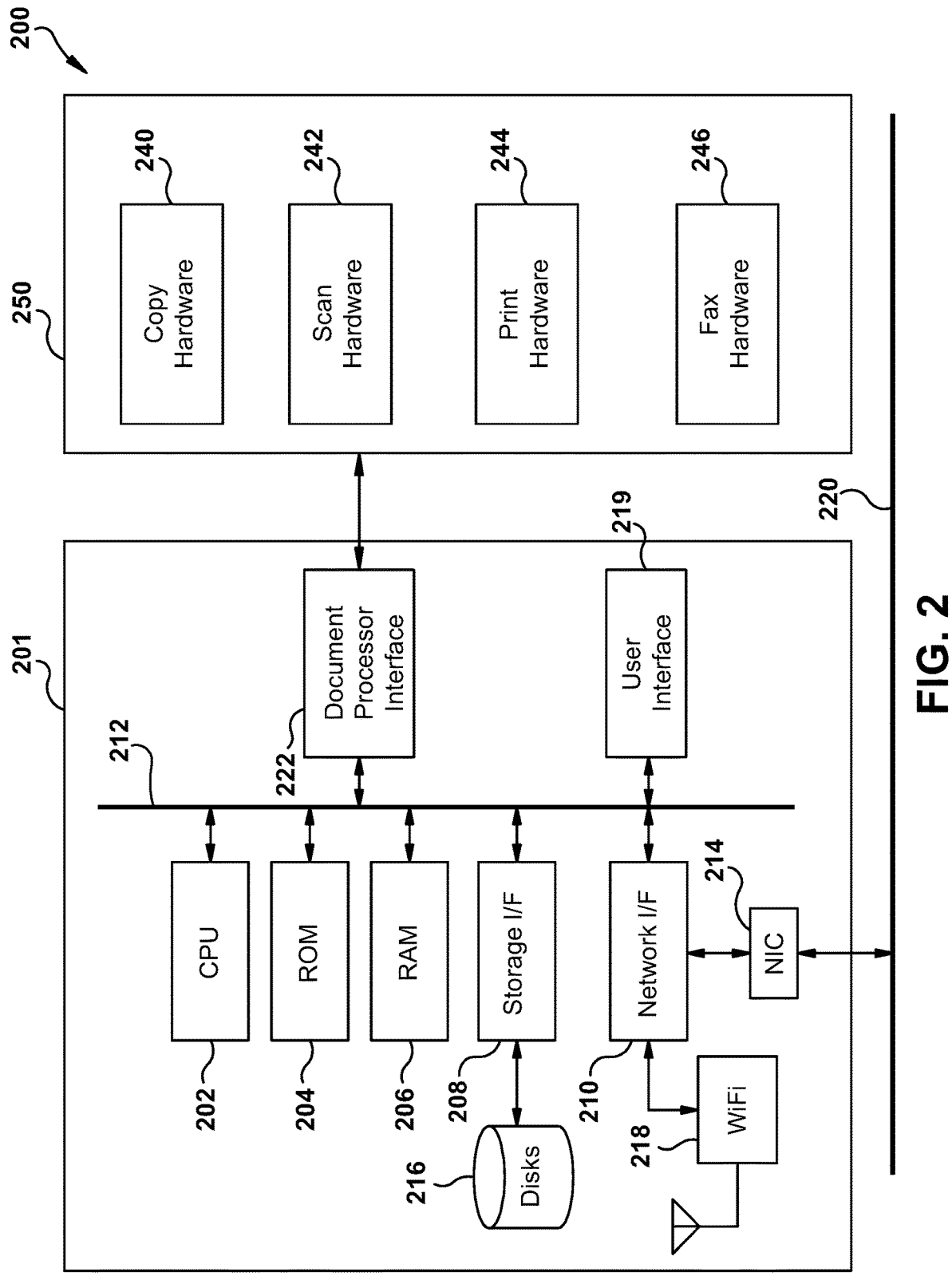
FIG. 2 is an example embodiment of a digital device such as a multifunction peripheral.

Turning now to FIG. 2 illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Thus, an MFP can itself function as a cloud server with the capabilities described herein. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with user interface 219 for interfacing with displays, keyboards, touchscreens, mice, trackballs and the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
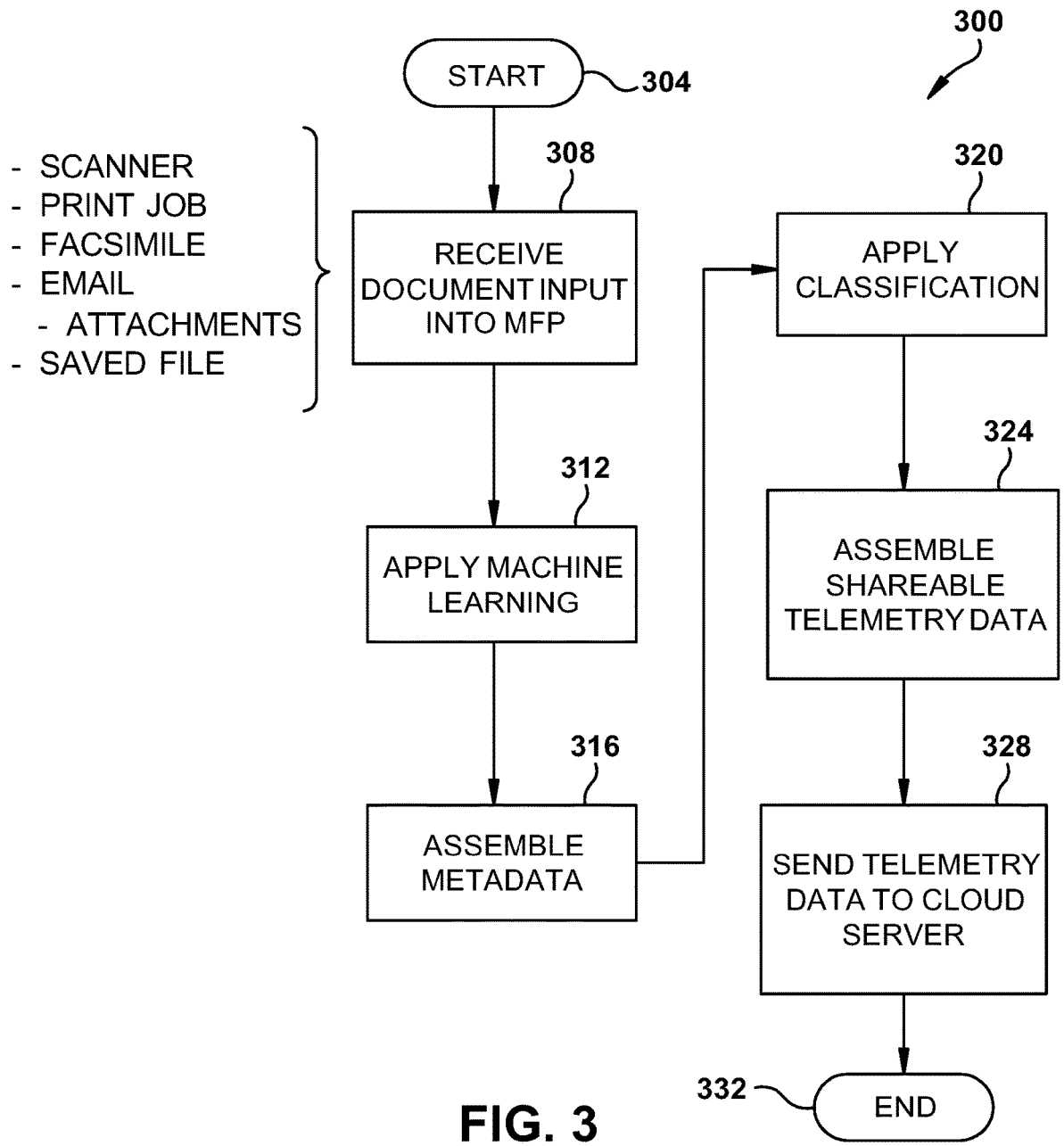
FIG. 3 is a flowchart of an example embodiment for machine learning classification on sensitive data for telemetry.

Turning now to FIG. 3, illustrated is an example embodiment of a flowchart 300 for machine learning classification on sensitive data for telemetry. The process commences at block 304, and proceeds to block 308 wherein document data is received into an MFP. Machine learning is applied to received data at block 312 and corresponding metadata is assembled at block 316. Classification or clustering of data is completed at block 320 and shareable telemetry data is assembled at block 324. Resultant telemetry data is sent to a cloud server at block 328, and the process terminates at block 332.

Figure 4:
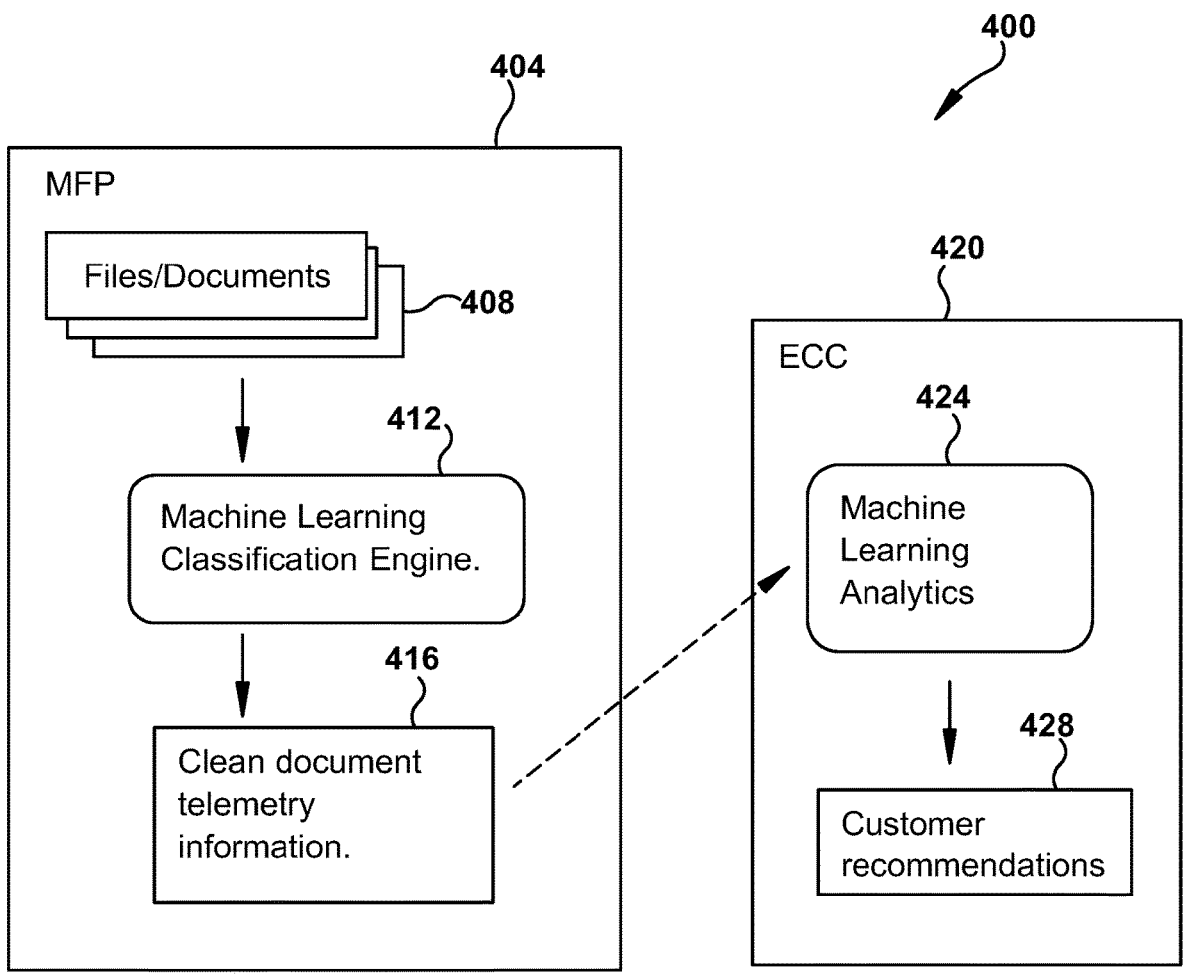
FIG. 4 is an example embodiment of a software platform for machine learning classification on sensitive data for telemetry.

FIG. 4 illustrates an example embodiment of a software platform 400 for machine learning classification on sensitive data for telemetry to a server for application of analytics. MFP 404 includes files or documents 408 associated with document processing operations. These items are classified by machine learning at block 412 to provide clean document telemetry information 416. Telemetry information 416 is communicated to a server 420, such as an e-BRIDGE CloudConnect server. Server 420 applies machine learning at block 424 to telemetry information received from MFP 404, resulting in generation of customer recommendations 428.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
   an intelligent controller having a processor and associated memory;
   a scan engine operable in connection with instructions received from the controller;
   a print engine operable in connection with instructions received from the controller to print electronic documents; and
   a network interface,
   wherein the processor is configured to receive electronic document data comprised of a plurality of electronic documents including sensitive or private print content,
   wherein the processor is further configured to apply machine learning to the electronic document data to extract metadata which excludes the sensitive or private print content, which metadata is comprised as data patterns associated with the sensitive or private print content, wherein the memory is configured to store metadata corresponding to the electronic documents, which metadata excludes the sensitive or private print content, wherein the processor is further configured to generate pattern classifications from extracted data patterns, wherein the processor is further configured to generate telemetry data corresponding to generated data patterns, and wherein the processor is further configured to send generated telemetry data to an associated server via the network interface.

2. The multifunction peripheral of claim 1 wherein the processor is further configured to reconfigure the multifunction peripheral in accordance with feedback from the associated server generated by application of machine learning on the generated telemetry data.

3. The multifunction peripheral of claim 2 wherein the processor is further configured to reconfigure the multifunction peripheral to accommodate a hardware change to the multifunction peripheral specified in accordance with the feedback.

4. The multifunction peripheral of claim 2 wherein the processor is further configured to reconfigure the multifunction peripheral to accommodate a software change to the multifunction peripheral specified in accordance with the feedback.

5. The multifunction peripheral of claim 1 wherein the electronic document data includes data corresponding to different document content types included in the plurality of electronic documents.

6. The multifunction peripheral of claim 5 wherein the content types include documents with graphic content and documents with character content.

7. The multifunction peripheral of claim 6 wherein the content types further include languages associated with character content.

8. The multifunction peripheral of claim 7 wherein the content types further include image content.

9. A method comprising:

acquiring electronic document data in accordance with electronic documents generated from printed document content from scanning operations and print content of electronic documents used in printing operations on a multifunction peripheral, wherein the electronic document data includes sensitive or private document content;

applying, via a processor of the multifunction peripheral, machine learning to the electronic document data metadata comprised of extracted patterns which exclude the sensitive or private document content while being associated with the sensitive or private document content;

storing metadata corresponding to the electronic documents in a memory;

generating pattern classifications from extracted data patterns;

generating telemetry data corresponding to generated data patterns; and generating telemetry data to an associated server via a network interface of the multifunction peripheral.

10. The method of claim 9 further comprising reconfiguring the multifunction peripheral in accordance with feedback from the associated server generated by application of machine learning on the generated telemetry data.

11. The method of claim 10 further comprising reconfiguring the multifunction peripheral to accommodate a hardware change to the multifunction peripheral specified in accordance with the feedback.

12. The method of claim 10 further comprising reconfiguring the multifunction peripheral to accommodate a software change to the multifunction peripheral specified in accordance with the feedback.

13. The method of claim 9 wherein the electronic document data includes data corresponding to different document content types included in the plurality of electronic documents.

14. The method of claim 13 wherein the content types include documents with graphic content and documents with character content.

15. The method of claim 14 wherein the content types further include languages associated with character content.

16. The method of claim 14 wherein the content types further include image content.

17. A system comprising:

a multifunction peripheral including,
   an intelligent controller having a controller processor and associated controller memory,
   a scan engine operable in connection with instructions received from the controller,
   a print engine operable in connection with instructions received from the controller, and
   a multifunction peripheral network interface,
   wherein the controller is configured to receive electronic document data comprised of a plurality of printable electronic documents,
   wherein the controller memory is configured to store metadata corresponding to sensitive or private print content of the electronic documents,
   wherein the controller is further configured to apply machine learning to the electronic document data extract data patterns associated with the sensitive or private print content but which exclude the sensitive or private print content,
   wherein the controller is further configured to generate pattern classifications from extracted data patterns,
   wherein the controller is further configured to generate telemetry data corresponding to generated data patterns, and
   wherein the processor is further configured to send generated telemetry data to a server via the multifunction peripheral network interface; and the server including,
   a server processor,
   a server memory, and
   a server network interface configured to receive telemetry data from the multifunction peripheral,
   wherein the server processor is configured to apply machine analytics to received telemetry data, and
   wherein the server processor is further configured to generate recommendations relative to operation of the multifunction peripheral in accordance with applied machine analytics.

18. The system of claim 17 wherein the electronic document data includes data corresponding to different document content types included in the plurality of electronic documents.

19. The system of claim 18 wherein the electronic document data includes metadata associated with the electronic documents corresponding to an associated industry type.

20. The system of claim 19 wherein the recommendations include a hardware modification or a software modification for the multifunction peripheral.

* * * * *